US011659453B2

(12) United States Patent
Khlass et al.

(10) Patent No.: US 11,659,453 B2
(45) Date of Patent: May 23, 2023

(54) EFFICIENT TRANSFER OF ACCESS CONTEXT FOR USER EQUIPMENT AMONG NETWORK NODES

(71) Applicant: Nokia Solutions and Networks Oy, Espoo (FI)

(72) Inventors: Ahlem Khlass, Nozay (FR); Stefano Paris, Vanves (FR); Daniela Laselva, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 129 days.

(21) Appl. No.: 17/183,966

(22) Filed: Feb. 24, 2021

(65) Prior Publication Data

US 2021/0274391 A1 Sep. 2, 2021

(51) Int. Cl.
*H04W 36/32* (2009.01)
*H04W 76/19* (2018.01)
(Continued)

(52) U.S. Cl.
CPC . *H04W 36/0033* (2013.01); *H04W 36/00835* (2018.08); *H04W 36/00837* (2018.08);
(Continued)

(58) Field of Classification Search
CPC ....... H04W 36/0033; H04W 36/00835; H04W 36/00837; H04W 36/32; H04W 36/24; H04W 76/19; H04W 76/27
See application file for complete search history.

(56) References Cited

U.S. PATENT DOCUMENTS 9,480,046 B1 10/2016 Mehta et al. ................. 455/458
10,037,231 B1* 7/2018 Jakhetiya ............. G06F 9/5072
(Continued)

FOREIGN PATENT DOCUMENTS

EP 2 123 088 9/2008
EP 3 367 980 5/2017
(Continued)

OTHER PUBLICATIONS

Hsieh et al., "CoPS: Context Prefetching Handover Scheme on 4G Outdoor Small Cell Testbed," 12th International Symposium on Modeling and Optimization in Mobile, Ad Hoc, and Wireless Networks, 2014, pp. 50-56 (Year: 2014).*
(Continued)

*Primary Examiner* — Un C Cho
*Assistant Examiner* — Lalita W Pace
(74) *Attorney, Agent, or Firm* — Harrington & Smith

(57) ABSTRACT

The present disclosure relates generally to the field of wireless communications, and in particular to techniques for efficiently transferring, among network nodes, an access context required to initiate data transfer when a user equipment (UE) is in an active or suspended Radio Access Network (RAN) connection state. The techniques disclosed herein involve identifying, based on UE-specific data (such, for example, as mobility information, a traffic profile), one or more relevant network nodes where the UE in the suspended RAN connection state could be located at the time when next data transfer needs to be initiated. After that, the access context is sent from an anchor network node to said one or more relevant network nodes. By sending the access context in this manner, network signalling overhead and storage capacity overhead may be significantly reduced.

13 Claims, 12 Drawing Sheets

(51) Int. Cl.
*H04W 76/27* (2018.01)
*H04W 36/00* (2009.01)

(52) U.S. Cl.
CPC .......... *H04W 36/32* (2013.01); *H04W 76/19* (2018.02); *H04W 76/27* (2018.02)

(56) References Cited

U.S. PATENT DOCUMENTS

| | | | |
|---|---|---|---|
| 2004/0203841 A1* | 10/2004 | Bayder | H04W 64/00 455/67.11 |
| 2007/0230399 A1 | 10/2007 | Oswal et al. | 370/331 |
| 2008/0240439 A1 | 10/2008 | Mukherjee et al. | 380/272 |
| 2013/0260764 A1* | 10/2013 | Gil | H04W 36/22 455/436 |
| 2014/0348133 A1 | 11/2014 | Fu et al. | 370/331 |
| 2016/0150475 A1* | 5/2016 | Rune | H04W 72/048 370/311 |
| 2016/0286605 A1* | 9/2016 | Voigt | H04W 76/38 |
| 2017/0272910 A1* | 9/2017 | Smith | H04W 4/021 |
| 2018/0270792 A1 | 9/2018 | Park et al. | 60/25 |
| 2019/0208500 A1* | 7/2019 | Jia | H04W 76/12 |
| 2019/0289505 A1* | 9/2019 | Thomas | H04W 68/02 |
| 2020/0092750 A1* | 3/2020 | Dharmadhikari | H04W 76/22 |
| 2022/0104169 A1* | 3/2022 | Kim | H04W 60/04 |
| 2022/0217586 A1* | 7/2022 | Yang | H04W 36/0027 |

FOREIGN PATENT DOCUMENTS

| | | |
|---|---|---|
| EP | 3 445 086 A1 | 2/2019 |
| WO | WO-2019/232746 A1 | 12/2019 |
| WO | WO-2020/040673 A1 | 2/2020 |

OTHER PUBLICATIONS

Ozturk et al., "A novel deep learning driven, low-cost mobility prediction approach for 5G cellular networks: the case of the Control/Data Separation Architecture (CDSA)" Neurocomputing 358, 2019, pp. 479-489 (Year: 2019).*

* cited by examiner

EFFICIENT TRANSFER OF ACCESS CONTEXT FOR USER EQUIPMENT AMONG NETWORK NODES

TECHNICAL FIELD

The present disclosure relates generally to the field of wireless communications, and in particular to techniques for efficiently transferring, among network nodes, an access context required to initiate data transfer when a user equipment (UE) is in an active or suspended Radio Access Network (RAN) connection state.

BACKGROUND

According to the 5G communication technology, if a UE is about to resume a Radio Resource Control (RRC) connection by accessing a target network node, i.e. gNodeB (gNB), other than a last serving gNB, the target gNB triggers a Xn Application Protocol (XnAP) Retrieve UE Access Stratum (AS) context procedure to receive a UE AS context from the last serving gNB. The last serving gNB is also referred to as an anchor gNB since it anchors the UE AS context in a Radio Access Network (RAN). The target gNB becomes a new serving or anchor gNB after the UE AS context is successfully relocated, whereas the UE AS context can be safely released in the last serving gNB. The UE AS context is then used to resume the RRC connection for the UE.

However, this XnAP Retrieve UE AS context procedure suffers from a resume latency, which is mainly affected by an Xn-interface latency. Assuming the Xn-interface latency of 10 ms, a retrieval latency will be at least 20 ms, i.e. round-trip time. Such a latency would increase significantly the resume latency (that is about 10 ms without the retrieval of the UE AS context). This can adversely affect the performance of services, such as time-sensitive applications, which are characterized by low-latency requirements.

As one possible workaround for the problem above, after the RRC connection is suspended for the UE, the last serving gNB could send the UE AS context to any gNBs in the RAN or a RAN notification area (RNA), within which the UE can resume the RRC connection. This would indeed reduce the resume latency as any target gNB in the RAN/RNA would avoid the XnAP Retrieve UE AS context procedure in case of resuming the RRC connection for the UE. However, pushing the UE AS context to all cells in the RAN/RNA increases both the Xn signalling overhead (i.e. useless UE AS context transfer to the gNBs where the UE will not resume at all) and the storage capacity overhead to store the UE AS context in each gNB, which could be rather consuming in respect to massive Internet-of-Thigs (MIoT) and Machine-Type-Communication (mMTC) applications.

SUMMARY

This summary is provided to introduce a selection of concepts in a simplified form that are further described below in the detailed description. This summary is not intended to identify key features or essential features of the present disclosure, nor is it intended to be used to limit the scope of the present disclosure.

It is an object of the present disclosure to provide a technical solution that enables a more efficient (in terms of network signalling, storage capacity, and a latency) transfer of an access context, which is required to initiate data transfer when a UE is in an active or suspended RAN connection state, from an anchor network node to one or more target network nodes.

The object above is achieved by the features of the independent claims in the appended claims. Further embodiments and examples are apparent from the dependent claims, the detailed description and the accompanying drawings. The embodiments that do not fall under the scope of the claims are to be interpreted as examples useful for understanding the disclosure.

According to a first aspect, an anchor network node is provided. The anchor network node comprises a transceiving unit, a storage unit, and at least one processor. The storage unit is configured to store: an access context required to initiate data transfer when a UE is in an active or suspended RAN connection state; mobility information and a traffic profile both relating to the UE; and processor-executable instructions. The at least one processor is coupled to the storage unit and configured, when executing the processor-executable instructions, to:
 (i) determine, based on the mobility information, that the UE is about to exit an anchor cell served by the anchor network node;
 (ii) predict, based on the mobility information and the traffic profile, a target time when the UE is about to initiate the data transfer, and at least one target cell in which the UE would appear to be located at the target time; and
 (iii) instruct the transceiving unit to send the access context to at least one target network node serving the at least one target cell before the target time.

In this example embodiment, the access context may be transferred proactively from the anchor network node to one or more other network nodes without having to use the legacy XnAP Retrieve UE AS context procedure, thereby minimizing or even avoiding the resume latency and reducing UE power consumption. Moreover, this example embodiment minimizes network signaling because the access context is transferred only to a predicted set of other network nodes, with the predicted set having a reduced number of such network nodes compared to that in the whole RAN/RNA. On top of that, this example embodiment may support small data transmission from the suspended RAN connection state, which is proposed in the 3GPP NR Rel-17.

In one example embodiment of the first aspect, the transceiving unit is configured to receive the mobility information and the traffic profile both reported, e.g., by the UE or any other network node(s), at least one time before or after initiating each data transfer when the UE is in the suspended or active RAN connection state. After that, the transceiving unit is configured to provide the mobility information and the traffic profile to the storage unit for their storage. By so doing, the anchor network node may be provided with most recent information about the UE, which in turn may improve the results of predicting the target time and the at least one target cell, in which the UE will likely initiate the data transfer at the target time.

In one example embodiment of the first aspect, the mobility information comprises, e.g., Radio Resource Management (RRM) measurements, a UE mobility state, a list of the best neighbor cells for the UE and network nodes belonging to the best neighbor cells, or any combination thereof, and the traffic profile comprises a traffic distribution over time, and/or an estimate of the traffic distribution over time to be expected after the suspension of the active RAN connection, including the timing of the arrival of the next data traffic. By configuring the mobility information and the traffic profile in this manner, one may improve the accuracy of predicting the target time and the at least one target cell.

In one example embodiment of the first aspect, the RRM measurements comprise a Reference Signal Received Power (RSRP) of the anchor cell. In this case, the at least one processor is configured to determine that the UE is about to exit the anchor cell if the UE mobility state is set to be non-stationary and the RSRP of the anchor cell is less than a threshold at the time when the active RAN connection state has been suspended. By so doing, one may improve the accuracy of deciding that the proactive transfer of the access context is needed.

In one other example embodiment of the first aspect, the RRM measurements comprise the highest of RSRPs of the best neighbor cells. In this case, the at least one processor is configured to determine that the UE is about to exit the anchor cell if the UE mobility state is set to be non-stationary and the highest RSRP is more than a threshold at the time when the active RAN connection state has been suspended. By so doing, one may improve the accuracy of deciding that the proactive transfer of the access context is needed.

In one more other embodiment of the first aspect, the at least one processor is configured to determine that the UE is about to exit the anchor cell if the UE mobility state has changed from stationary to non-stationary. By so doing, one may improve the accuracy of deciding that the proactive transfer of the access context is needed.

In one example embodiment of the first aspect, the at least one processor is configured to predict the target time and the at least one target cell by solving an optimization problem or using a priority scheduling algorithm, such, e.g., as the Earliest Deadline First (EDF) policy. This may provide better prediction results.

In one example embodiment of the first aspect, the at least one processor is configured to use probability distributions of the mobility information and the traffic profile when solving the optimization problem or using the priority scheduling algorithm. This may allow the anchor network node to cope with possible uncertainties associated with the mobility information and the traffic profile.

In one example embodiment of the first aspect, the at least one processor is configured to predict the target time and the at least one target cell by using supervised or unsupervised machine learning algorithms. This may make the anchor network node more flexible in use, as well as minimize manual work.

According to a second aspect, an anchor network node is provided. The anchor network node comprises a transceiving unit, a storage unit, and at least one processor. The transceiving unit is configured to receive downlink data for a UE being in a suspended RAN connection state. The storage unit is configured to store: an access context required to initiate data transfer when the UE is in an active RAN connection state or the suspended RAN connection state; mobility information and a traffic profile both relating to the UE; the downlink data; and processor-executable instructions. The at least one processor is coupled to the storage unit and configured, when executing the processor-executable instructions, to:
 (i) determine, based on the mobility information, that the UE is about to exit an anchor cell served by the anchor network node;
 (ii) predict, based on the mobility information and the traffic profile, at least one target cell in which the UE would appear to be located subsequently, i.e. upon exiting the anchor cell; and
 (iii) instruct the transceiving unit to send a request for paging initiation, the access context and the downlink data to at least one target network node serving the at least one target cell, so that the at least one target network node could page the UE to deliver the downlink data to the UE.

In this example embodiment, the request for paging initiation, the access context and the downlink data may be transferred from the anchor network node to one or more other network nodes within the RAN/RNA with minimal signaling and storage overhead, since the request for paging initiation, the access context and the downlink data are transferred only to a predicted set of other network nodes, with the predicted set having a reduced number of such network nodes compared to that in the whole RAN/RNA. On top of that, this example embodiment may support the small data transmission from the suspended RAN connection state, which is proposed in the 3GPP NR Rel-17.

In one example embodiment of the second aspect, the transceiving unit is further configured to receive the mobility information and the traffic profile both reported, e.g., by the UE or any other network node(s), at least one time before of after initiating each data transfer when the UE is in the suspended or active RAN connection state. After that, the transceiving unit is further configured to provide the mobility information and the traffic profile to the storage unit for the storage thereof. By so doing, the anchor network node may be provided with most recent information about the UE, which in turn may improve the results of predicting the at least one target cell.

In one example embodiment of the second aspect, the mobility information comprises Radio Resource Management (RRM) measurements, a UE mobility state, a list of the best neighbor cells for the UE and network nodes belonging to the best neighbor cells, or any combination thereof, and the traffic profile comprises a traffic distribution over time, and/or an estimate of the traffic distribution over time to be expected after the suspension of the active RAN connection, including the timing of the arrival of the next data traffic. By configuring the mobility information in this manner, one may improve the accuracy of predicting the at least one target cell.

In one example embodiment of the second aspect, the RRM measurements comprise a Reference Signal Received Power (RSRP) of the anchor cell. In this case, the at least one processor is configured to determine that the UE is about to exit the anchor cell if the UE mobility state is set to be non-stationary and the RSRP of the anchor cell is less than a threshold at the time when the active RAN connection state has been suspended. By so doing, one may improve the accuracy of deciding that the transfer of the access context is needed.

In one other example embodiment of the second aspect, the RRM measurements comprise the highest of RSRPs of the best neighbor cells. In this case, the at least one processor is configured to determine that the UE is about to exit the anchor cell if the UE mobility state is set to be non-stationary and the highest RSRP is more than a threshold at the time when the active RAN connection state has been suspended. By so doing, one may improve the accuracy of deciding that the transfer of the access context is needed.

In one more other example embodiment of the second aspect, the at least one processor is configured to determine that the UE is about to exit the anchor cell if the UE mobility state has changed from stationary to non-stationary. By so doing, one may improve the accuracy of deciding that the transfer of the access context is needed.

In one example embodiment of the second aspect, the at least one processor is configured to predict the at least one target cell by solving an optimization problem or using a priority scheduling algorithm, such, e.g., as the Earliest Deadline First (EDF) policy. This may provide better prediction results.

In one example embodiment of the second aspect, the at least one processor is configured to use probability distributions of the mobility information and the traffic profile when solving the optimization problem or using the priority scheduling algorithm. This may allow the anchor network node to cope with possible uncertainties associated with the mobility information and the traffic profile.

In one example embodiment of the second aspect, the at least one processor is configured to predict the at least one target cell by using supervised or unsupervised machine learning algorithms. This may make the anchor network node more flexible in use, as well as minimize manual work.

According to a third aspect, a method for operating an anchor network node is provided. The method comprises the step of storing an access context required to initiate data transfer when a UE is in an active or suspended RAN connection state. The method further comprises the step of determining, based on pre-stored mobility information, that the UE is about to exit an anchor cell served by the anchor network node. The method further comprises the step of predicting, based on the pre-stored mobility information and a pre-stored traffic profile, a target time when the UE is about to initiate the data transfer, and at least one target cell in which the UE would appear to be located at the target time. The method eventually comprises the step of sending the access context to at least one target network node serving the at least one target cell before the target time. In this example embodiment, the access context may be transferred proactively from the anchor network node to one or more other network nodes without having to use the legacy XnAP Retrieve UE AS context procedure, thereby minimizing or even avoiding the resume latency and reducing UE power consumption. Moreover, this example embodiment minimizes network signaling because the access context is transferred only to a predicted set of other network nodes, with the predicted set having a reduced number of such network nodes compared to that in the whole RAN/RNA. On top of that, this example embodiment may support the small data transmission from the suspended RAN connection state, which is proposed in the 3GPP NR Rel-17.

According to a fourth aspect, a method for operating an anchor network node is provided. The method comprises the step of storing an access context required to initiate data transfer when a UE is in an active or suspended RAN connection state. The method further comprises the steps of receiving and storing downlink data for the UE, for example, from a Data Network (DN), such as Internet. The method further comprises the step of determining, based on pre-stored mobility information, that the UE is about to exit an anchor cell served by the anchor network node. The method further comprises the step of predicting, based on the pre-stored mobility information and a pre-stored traffic profile, at least one target cell in which the UE would appear to be located shortly, i.e. upon exiting the anchor cell. The method eventually comprises the step of sending a request for paging initiation, the access context and the downlink data to at least one target network node serving the at least one target cell, so that the at least one target network node could page the UE to deliver the downlink data to the UE. In this example embodiment, the request for paging initiation, the access context and the downlink data may be transferred from the anchor network node to one or more other network nodes with minimal signaling and storage overhead, since they are all transferred only to a predicted set of other network nodes, with the predicted set having a reduced number of such network nodes compared to that in the whole RAN/RNA. On top of that, this example embodiment may support the small data transmission from the suspended RAN connection state, which is proposed in the 3GPP NR Rel-17.

According to a fifth aspect, a computer program product is provided, which comprises a computer-readable medium having a computer code stored thereon. The computer code, when executed by at least one processor, causes the at least one processor to perform the method according to the third aspect of the present disclosure. This may simplify the implementation of the method according to the third aspect of the present disclosure.

According to a sixth aspect, a computer program product is provided, which comprises a computer-readable medium having a computer code stored thereon. The computer code, when executed by at least one processor, causes the at least one processor to perform the method according to the fourth aspect of the present disclosure. This may simplify the implementation of the method according to the fourth aspect of the present disclosure.

According to a seventh aspect, an anchor network node is provided. The anchor network node comprises a means for storing: an access context required to initiate data transfer when a UE is in an active or suspended RAN connection state of a UE; and mobility information and a traffic profile both relating to the UE. The anchor network node further comprises a means for determining, based on the mobility information, that the UE is about to exit an anchor cell served by the anchor network node. The anchor network node further comprises a means for predicting, based on the mobility information and the traffic profile, a target time when the UE is about to initiate data transfer, and at least one target cell in which the UE would appear to be located at the target time. The anchor network node further comprises a means for sending the access context to at least one target network node serving the at least one target cell before the target time. In this example embodiment, the access context may be transferred proactively from the anchor network node to one or more other network nodes without having to use the legacy XnAP Retrieve UE AS context procedure, thereby minimizing or even avoiding the resume latency and reducing UE power consumption. Moreover, this example embodiment minimizes network signaling because the access context is transferred only to a predicted set of other network nodes, with the predicted set having a reduced number of such network nodes compared to that in the whole RAN/RNA. On top of that, this example embodiment may support the small data transmission from the suspended RAN connection state, which is proposed in the 3GPP NR Rel-17.

According to an eighth aspect, an anchor network node is provided. The anchor network node comprises a means for receiving and storing downlink data for a UE being in a suspended RAN connection state. The anchor network node further comprises a means for storing: an access context required to initiate data transfer when the UE is in an active or suspended RAN connection state; and mobility information and a traffic profile both relating to the UE. The anchor network node further comprises a means for determining, based on the mobility information, that the UE is about to exit an anchor cell served by the anchor network node. The anchor network node further comprises a means for predicting, based on the mobility information and the traffic profile, at least one target cell in which the UE would appear to be located shortly, i.e. upon exiting the anchor cell. The anchor network node further comprises a means for sending a request for paging initiation, the access context and the downlink data to at least one target network node serving the at least one target cell, so that the at least one target network node could page the UE to deliver the downlink data to the UE. In this example embodiment, the request for paging initiation, the access context and the downlink data may be transferred from the anchor network node to one or more other network nodes with minimal signaling and storage overhead, since the paging message, they are all transferred only to a predicted set of other network nodes, with the predicted set having a reduced number of such network nodes compared to that in the whole RAN/RNA. On top of that, this example embodiment may support the small data transmission from the suspended RAN connection state, which is proposed in the 3GPP NR Rel-17.

Other features and advantages of the present disclosure will be apparent upon reading the following detailed description and reviewing the accompanying drawings.

BRIEF DESCRIPTION OF THE DRAWINGS

The essence of the present disclosure is explained below with reference to the accompanying drawings in which.

DETAILED DESCRIPTION

Figure 1:
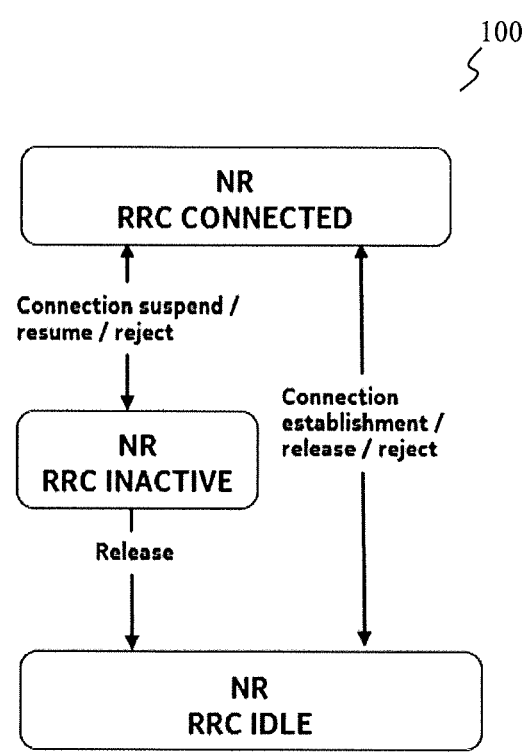
FIG. 1 shows an RRC state machine for a Next-Generation (NG) RAN.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

The word "example" is used herein in the meaning of "used as an illustration". Unless otherwise stated, any embodiment described herein as "example" should not be construed as preferable or having an advantage over other embodiments.

According to the example embodiments disclosed herein, a user equipment or UE for short may refer to a mobile device, a mobile station, a terminal, a subscriber unit, a mobile phone, a cellular phone, a smart phone, a cordless phone, a personal digital assistant (PDA), a wireless communication device, a laptop computer, a tablet computer, a gaming device, a netbook, a smartbook, an ultrabook, a medical device or medical equipment, a biometric sensor, a wearable device (for example, a smart watch, smart glasses, a smart wrist band), an entertainment device (for example, an audio player, a video player, etc.), a vehicular component or sensor, a smart meter/sensor, industrial manufacturing equipment, a global positioning system (GPS) device, an Internet-of-Things (IoT) device, a machine-type communication (MTC) device, a group of Massive IoT (MIoT) or Massive MTC (mMTC) devices/sensors, or any other suitable device configured to support wireless communications. In one other example embodiment, the UE may refer to at least two collocated and inter-connected UEs thus defined.

According to the example embodiments disclosed herein, a network node may relate to a node of a Radio Access Network (RAN), such as a Global System for Mobile Communications (GSM) RAN (GRAN), a GMS EDGE RAN (GERAN), a Universal Mobile Telecommunications System (UMTS) RAN (UTRAN), a Long-Term Evolution (LTE) UTRAN (E-UTRAN), Next-Generation (NG) RAN. Such a network node is used to connect the UE to a Data Network (DN) through a Core Network (CN), and is referred to as a base transceiver station (BTS) in terms of the 2G communication technology, a NodeB in terms of the 3G communication technology, an evolved NodeB (eNodeB) in terms of the 4G communication technology, and a gNodeB (gNB) in terms of the 5G communication technology and New Radio (NR) air interface.

According to the example embodiments disclosed herein, an active RAN connection state may refer to a state where the UE is connected to the RAN and the CN via the network node and is able to receive and transmit data traffic with no restriction of data size, and a suspended RAN connection state may refer to a state where the UE maintains information relating to its preceding connection to the RAN via the network node, but in a suspended fashion, in which either no data traffic is temporarily available to the UE or data traffic is available with limitation (for instance, data transferred are supported up to, e.g., 1000 byte). In the 5G NR system, these RAN connection states are defined in accordance with a Radio Resource Control (RRC) protocol (complemented in the 3GPP NR Rel-15), for which reason the active RAN connection state is called RRC_CONNECTED and the suspended RAN connection state is called RRC_INACTIVE. There is also an idle state, i.e. RRC_IDLE, in which the UE has no connection with the RAN nor the CN, thereby significantly reducing power consumption similarly to the RRC_INACTIVE state. It should be noted that the present disclosure is not limited to the above-defined RRC states, and any other similar connection states, which are already existing or may be invented in future, may be used instead of the RRC states.

FIG. 1 shows an RRC state machine 100 for the NG RAN. As shown in FIG. 1, the UE may be either in the RRC_CONNECTED state or in the RRC_INACTIVE state when an RRC connection has been established. If this is not the case, i.e. no RRC connection is established, the UE is in the RRC_IDLE state.

The RRC_INACTIVE state enables the full RRC connection to be quickly resumed, whereupon the transmission of small or sporadic data may be initiated with a much lower initial access delay and associated signalling overhead as compared to the RRC_IDLE state. In other words, the RRC_INACTIVE state enables a faster transition to the RRC_CONNECTED state. This is achieved mainly thanks to reduced control signalling required for requesting and obtaining the resume of a suspended RRC connection, which results in saving UE power saving. At the same time, the UE in the RRC_INACTIVE state is able to achieve similar power savings as in the RRC_IDLE state. Although the RRC state machine 100 was conceived particularly for mMTC/MIoT services, it could be beneficial to efficiently deliver small/infrequent traffic of Enhanced Mobile Broadband (eMBB) such as background traffic generated from eMBB applications, and Ultra-Reliable Low-Latency Communication (URLLC) services as well.

The UE in the RRC_INACTIVE state can move within an area configured by RAN without any notification (i.e. RAN Notification Area (RNA)) and using a unique identifier: Inactive-Radio Network Temporary Identifier (I-RNTI). This RNA can cover a single or multiple cell(s) and shall be contained within a CN registration area. A RAN-based Notification Area Update (RNAU) procedure is run by the UE periodically and when the UE re-selects a cell that does not belong to the configured RNA. It should be noted that the UE maintains a configuration for the RRC_INACTIVE state as received from a RAN network node. Said configuration comprises at least information on the RNA assigned for the UE. Said configuration may also comprise information on an anchor access node (i.e. the last serving network node) of the UE, e.g., implicitly based on the I-RNTI that was assigned by the anchor network node. The information on the RNA may comprise, for example, a list of cells configured as part of said RNA and/or a list of RAN-area codes (RANAC) associated with said RNA.

When the UE is moved to the RRC_INACTIVE state via an RRC Connection Suspend message, a UE AS context, necessary for the quick resume of the full RRC connection, is maintained both at the UE side and RAN side. It is noted that, at the RRC connection resume (simply referred to as resume thereafter), the UE is identified by the I-RNTI. The UE AS context contains, for instance, bearer configuration parameters according to the latest RRC configuration and AS security context pointing to integrity protection and ciphering algorithms and AS keys. Based on the latter, the UE is capable of deriving (short) Message Authentication Code-Integrity (MAC-I) field to be used as an authentication token, and is included in a request message the UE in the RRC_INACTIVE state sends to the RAN when it wants to send signalling or data.

Figure 2:
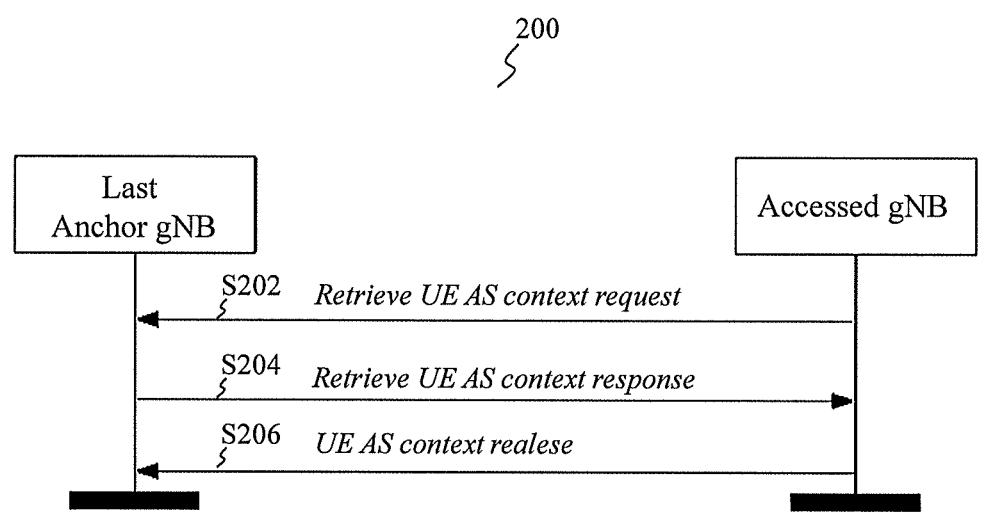
FIG. 2 shows an interaction diagram for transferring an access context from a last anchor gNB to an accessed gNB in accordance with the legacy XnAP Retrieve UE AS context procedure.

FIG. 2 shows a typical interaction diagram 200 for transferring the UE AS context from a last anchor gNB to an accessed gNB. The accessed gNB is a network node which is accessed by the UE in the RRC_INACTIVE state. In particular, the UE sends a resume request to the accessed gNB, i.e. a request for resuming the RRC_CONNECTED state from the RRC_INACTIVE state. To perform such transition, the accessed gNB triggers the legacy XnAP Retrieve UE AS context procedure to receive the UE AS context from the last anchor gNB. More specifically, the accessed gNB sends, in a step S202, a Retrieve UE AS context request to the last anchor gNB, and receives, in a step S204, a Retrieve UE AS context response from the last anchor gNB. After that, the accessed gNB becomes a new anchor gNB, and instruct, in a step S206, the last anchor gNB to release the UE AS context. Upon reception of such an instruction, the last anchor gNB can release radio and user/control plane related resources associated with the UE AS context, including CN resources (e.g. a NG Application Protocol (NGAP) Path Switch Request procedure upon context relocation can take place as well). After that, the interaction diagram 200 ends up.

However, such a context retrieval procedure may result in a significant resume latency primarily caused by an Xn-interface latency. This may affect the performance of services characterized by low latency requirements. One category of such services which are envisioned to be supported by the 5G communication technology includes URLLC services. The URLLC services refer to future applications which require reliable data communications from one end to another, while fulfilling ultra-low latency constraints. The URLLC services are required for latency sensitive devices for applications like factory automation, autonomous driving, and remote surgery. With that said, the data exchange between the UE and the DN should be fast and reliable as much as possible, so that the UE may use the URLLC services. Additionally, such additional latency may be deleterious also for other traffic categories, such as eMBB.

Figure 3:
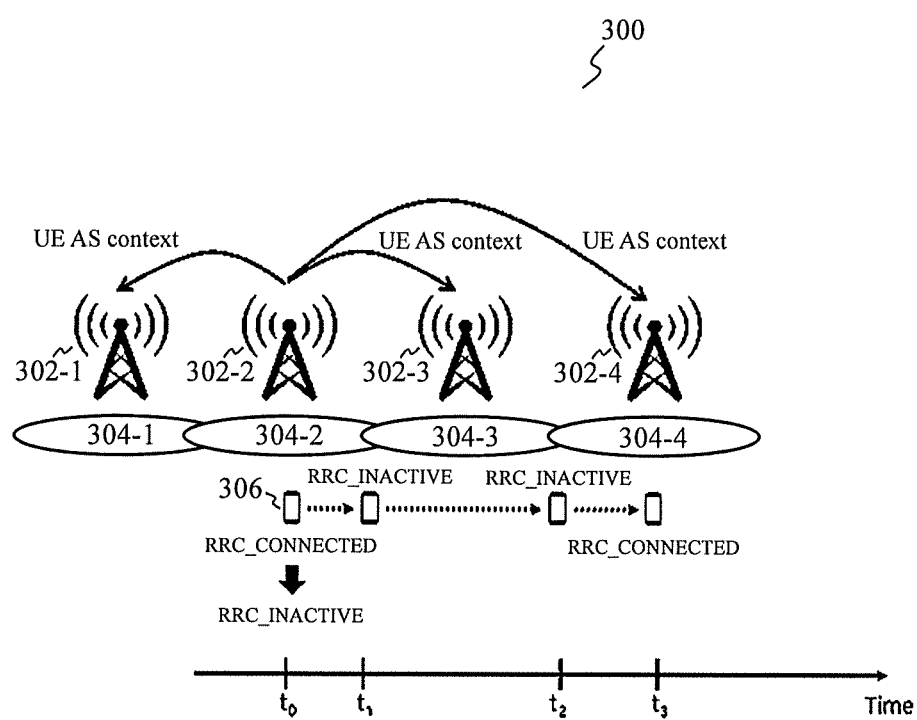
FIG. 3 schematically illustrates one possible workaround for the problem of a significant resume latency primarily caused by an Xn-interface latency.

FIG. 3 schematically illustrates one possible workaround for the above problem. More specifically, a NG RAN 300 consists of the following four network nodes: a gNB 302-1 serving a cell 304-1, a gNB 302-2 serving a cell 304-2, a gNB 302-3 serving a cell 304-3, and a gNB 302-4 serving a cell 304-4. Assuming that a UE 306 transits from the RRC_CONNECTED state to the RRC_INACTIVE state within the cell 304-2 at a time $t_0$. In this case, the gNB 302-2 is considered as a last anchor gNB, i.e. it anchors the UE AS context. To minimize the resume latency, the gNB 302-2 may send the UE AS context of the UE 306 to each of the gNBs 302-1, 302-3, and 302-4, so that they could be provided in advance with the UE AS context next time when the UE 306 decides to initiate data transfer, which in turn requires resuming the RRC_CONNECTED state in this example. As shown in FIG. 3, the UE 306 remains the RRC_INACTIVE state at next times $t_1$ and $t_2$ when passing through the cell 304-3, and requests the resume of the RRC_CONNECTED state at a time $t_3$ when located in the cell 304-4. In other words, the gNB 302-4 should be considered as a new anchor gNB for the UE 306.

Thus, the above-described workaround may indeed reduce the resume latency as any of the gNBs 302-1, 302-3, and 302-4 in the NG RAN 300 will avoid the legacy XnAP Retrieve UE AS context procedure at the time when the UE 306 requests the resume of the RRC_CONNECTED state. However, pushing the UE AS context from the last anchor gNB 302-2 to all the gNBs 302-1, 302-3, and 302-4 in the NG RAN 300 increases both the Xn signalling overhead (i.e. useless UE AS context transfer to the gNBs 302-1, 302-3 where the UE 306 will not request the resume of the RRC_CONNECTED state) and the storage capacity overhead to store the UE AS context in any gNB. These overheads could be especially adverse in the MIoT and mMTC applications.

It should be noted that a similar network signalling overhead issue—i.e. similar to the signalling overhead due to the UE AS context retrieval procedure as explained above for the UE-initiated resume of the active RAN connection state (for uplink data transfer)—is present in case of the network-initiated resume of the active RAN connection state (for downlink data transfer) and similarly for downlink small data transfer without an RRC state change. In this case, the anchor network node needs to perform RAN paging through every cell in the RNA, since the location of the UE is only known at an RNA area level (but not at a cell level). This may result in a large network signalling overhead, which is not desirable especially if the RNA area comprises a large number of cells.

The example embodiments disclosed herein provide a technical solution that allows mitigating or even eliminating the above-sounded drawbacks peculiar to the prior art. In particular, the technical solution involves:

identifying, based on UE-specific data (such, for example, as mobility information, a traffic profile), one or more relevant network nodes where the UE could be located at the time of initiating next data transfer (and this data transfer may either require resuming the active RAN connection state of the UE, or be performed when the UE is in the suspended RAN connection state); and sending the access context from the anchor network node to said one or more relevant network nodes.

Said one or more relevant network nodes are referred to herein as target network nodes. By sending the access context in this manner, one may significantly minimize the network signalling overhead and the storage capacity overhead, as well as reduce the resume latency for the UE.

The above-described general concept of the technical solution may be used both in an uplink scenario and a downlink scenario. The uplink scenario corresponds to the UE-initiated resume of the active RAN connection state to perform uplink data transfer, or to the uplink data transfer without changing the RAN connection state (i.e. from the suspended RAN connection state). The uplink scenario takes place when the UE has uplink data to transmit. The downlink scenario corresponds to the network-initiated resume of the active RAN connection state to perform downlink data transfer, or to the downlink data transfer without changing the RAN connection state (i.e. from the suspended RAN connection state). The downlink scenario takes place when the last anchor network node has downlink data for the UE and needs to find its potential location. Each of the uplink and downlink scenarios will be now described in more detail with reference to the accompanying figures.

Uplink Scenario

In the uplink scenario, the following predictions should be made:

when the UE could have uplink data for next transmission (which, in turn, could cause the UE to request the resume of the active RAN connection state or initiate the so-called small data transmissions from the suspended RAN connection state), and where the UE could be located at that time (i.e. in which network node(s)/cell(s) within the RNA).

The above predictions may then be used as follows: The anchor network node will proactively transfer the access context (for example, the UE AS context in terms of the RRC protocol) of the UE to one or more target network nodes before the UE initiates the next data transfer, thus minimizing signaling overhead and additionally avoiding the access context retrieval latency. Thus, the access context transfer will be triggered only for said one or more predicted network nodes in the RAN (i.e. some network nodes in the RNA but not all). Similarly, the target network node(s) may initiate the retrieval of the access context before the UE requests the next data transfer.

Figure 4:
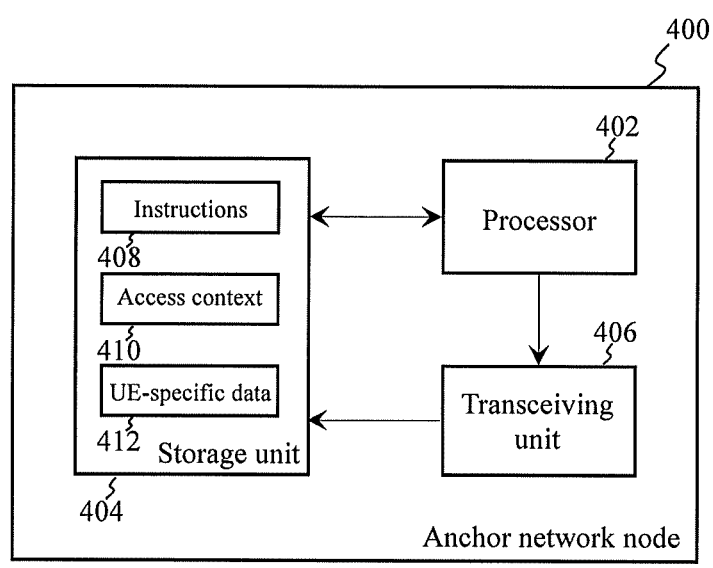
FIG. 4 shows a block-scheme of an anchor network node capable of implementing an uplink scenario (i.e. the UE-initiated resume of the active RAN connection state) in accordance with one example embodiment.

FIG. 4 shows a block-scheme of an anchor network node 400 capable of implementing the uplink scenario in accordance with one example embodiment. As shown in FIG. 4, the anchor network node 400 comprises at least the following constructive elements: a processor 402, a storage unit 404, and a transceiving unit 406. The storage unit 404 is coupled to the processor 402 and stores processor-executable instructions 408 which, when executed by the processor 402, cause the processor 402 to perform the aspects of the present disclosure, as will be explained later. The storage unit 404 further comprises: an access context 410 required to initiate the data transfer when the UE, such, for example, as the UE 306 shown in FIG. 3, is in the active or suspended RAN connection state; and UE-specific data 412 relating to the UE. In particular, the UE-specific data 412 may comprise mobility information and/or a traffic profile both relating to the UE. It should be noted that the number, arrangement and interconnection of the constructive elements constituting the anchor network node 400, which are shown in FIG. 4, are not intended to be any limitation of the present disclosure, but merely used to provide a general idea of how the constructive elements may be implemented within the anchor network node 400. In one other exemplary embodiment, the transceiving unit 406 may be implemented as two individual devices, with one for receiving operations and another for transmitting operation. Irrespective of its implementation, the transceiving unit 406 is implied to be capable of performing different operations required to perform the reception and transmission of different signals, such, for example, as signal modulation/demodulation.

The processor 402 may be implemented as a central processing unit (CPU), general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 402 may be implemented as any combination of one or more of the aforesaid. As an example, the processor may be a combination of two or more microprocessors.

The storage unit 404 may be implemented as a nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 408 stored in the storage unit 404 may be configured as a computer executable code which causes the processor 402 to perform the aspects of the present disclosure. The computer executable code for carrying out operations or steps for the aspects of the present disclosure may be written in any combination of one or more programming languages, such as Java, C++, or the like. In some examples, the computer executable code may be in the form of a high level language or in a pre-compiled form, and be generated by an interpreter (also pre-stored in the storage unit 404) on the fly.

The mobility information that may be included in the UE-specific data 412 in the uplink scenario may be configured as follows. The mobility information may comprise Radio Resource Management (RRM) measurements, a UE mobility state, a list of the best neighbor cells for the UE and network nodes belonging to the best neighbor cells, or any combination thereof. The RRM measurements taken by the UE may comprise at least the following measurements: Channel State Indicator (CSI), Channel Quality Indicator (CQI), Reference Signal Received Power (RSRP), Reference Signal Received Quality (RSRQ), and Carrier Received Signal Strength Indicator (RSSI), Signal-to-Noise-and-Interference Ratio (SINR). The mobility state may indicate whether the UE is stationary, non-stationary, slow-moving, or fast-moving (which may be determined based on a UE movement speed).

The traffic profile that may be included in the UE-specific data 412 in the uplink scenario, either instead of or in addition to the mobility information, may comprise a traffic distribution (for example, traffic arrival of one or more applications) over time. This profile may be learnt, e.g., based on the traffic profile experienced before suspending the active RAN connection state of the UE. Besides the user plane data above, the traffic profile may also comprise control plane data, such, for example, as a periodic RNA update message where the UE may notify its presence and location to the network (with or without a resume of the active RAN connection state).

Figure 5:
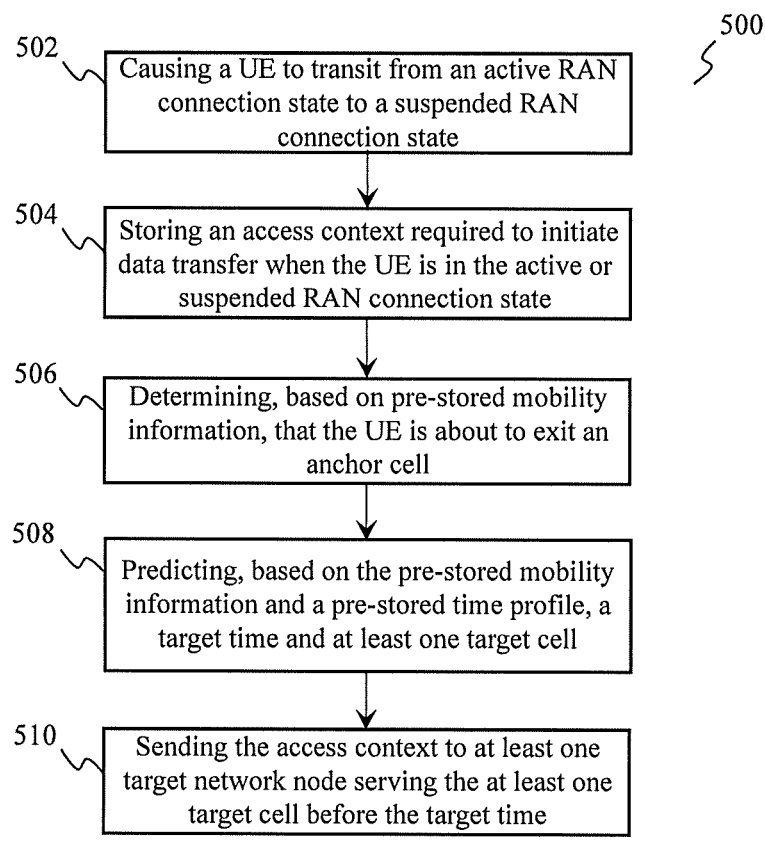
FIG. 5 shows a flowchart of a method for operating the anchor network node shown in FIG. 4 in accordance with one exemplary embodiment.

FIG. 5 shows a flowchart of a method 500 for operating the anchor network node 400 in accordance with one exemplary embodiment. In this example embodiment, it is assumed that the UE-specific data 412 is defined by the combination of the mobility information and the traffic profile. Each of the steps of the method 500 is performed by corresponding one of the above-described constructive elements constituting the anchor network node 400. The method 500 starts with a step S502, in which the processor 402 cause the UE to transit from the active RAN connection state to the suspended RAN connection state. In an alternative example embodiment, the UE may perform such transition by itself. After that or in parallel, the storage unit 404 may store, in a step S504, the access context 410 required to initiate, in future, the data transfer from the active or suspended RAN connection state of the UE. Further, the method 500 proceeds to a step S506, in which the processor 402 determines, based on the pre-stored mobility information, that the UE is about to exit an anchor cell. In this case, the anchor cell is implied as a cell served by the anchor network node 400. Next, in a step S508, the processor 402 predicts, based on the pre-stored mobility information and a pre-stored time profile, a target (next) time when the UE is about to initiate the data transfer (which may request resuming the active RAN connection state), and at least one target cell in which the UE would appear to be located at the target time. The method 500 ends up with a step S510, in which the processor 402 instruct the transceiving unit 406 to send the access context 410 to at least one target network node serving the at least one target cell before the target time.

In one example embodiment, the processor 402 is configured to prepare configuration information, according to which the UE should report the mobility information and the traffic profile at least one time before or after initiating each data transfer from the suspended or active RAN connection state. For example, the processor 402 may instruct the transceiving unit 406 to send the configuration information to the UE when the UE is in the active RAN connection state. The UE may, in turn, report the mobility information and the traffic profile, e.g., as part of a Message 3 (Msg3) or Message 5 (Msg5) (for example, as part of the RRC resume request or RRC resume complete messages in terms of the RRC protocol). The transceiving unit 406 may further be configured to receive the mobility information and the traffic profile reported by the UE and provide them to the storage unit 404, so that they may be used further in the method 500.

In one example embodiment, the RRM measurements comprise the RSRP of the anchor cell served by the network node 400. In this case, the processor 402 may determine, in the step S506, that the UE is about to exit the anchor cell if the UE mobility state is set to be non-stationary (i.e. the UE is moving) and the RSRP of the anchor cell is less than a threshold at the time when the active RAN connection state has been suspended. The latter means that the UE is at the edge of the anchor cell (i.e. there is a risk that the UE will perform cell reselection).

In one other example embodiment, the RRM measurements comprise the RSRP that is the highest among RSRPs of the best neighbor cells. In this case, the processor 402 may determine, in the step S506, that the UE is about to exit the anchor cell if the UE mobility state is set to be non-stationary (i.e. the UE is moving) and the highest RSRP is more than a threshold at the time when the active RAN connection state has been suspended. Similarly, the latter means that the UE is at the edge of the anchor cell (i.e. there is again a risk that the UE will perform cell reselection).

In one more other example embodiment, the processor 402 is configured to determine, in the step S506, that the UE is about to exit the anchor cell if the UE mobility state has changed from stationary to non-stationary. In other words, if the last mobility information stored in the storage unit 404 is indicative of the stationary UE mobility state, and if the transceiving unit 406 receives new mobility information according to which the UE mobility state is no longer stationary, the processor 402 may decide that the UE is going to exit the anchor cell.

It should be noted that, in the embodiments disclosed herein, the stationarity of the UE may be also determined based on changes of the RSRP in time, i.e. if the RSRP does not change more than a certain delta in time, then the UE is stationary. Other means may also be adopted for this determination, as should be apparent to those skilled in the art.

Figure 6:
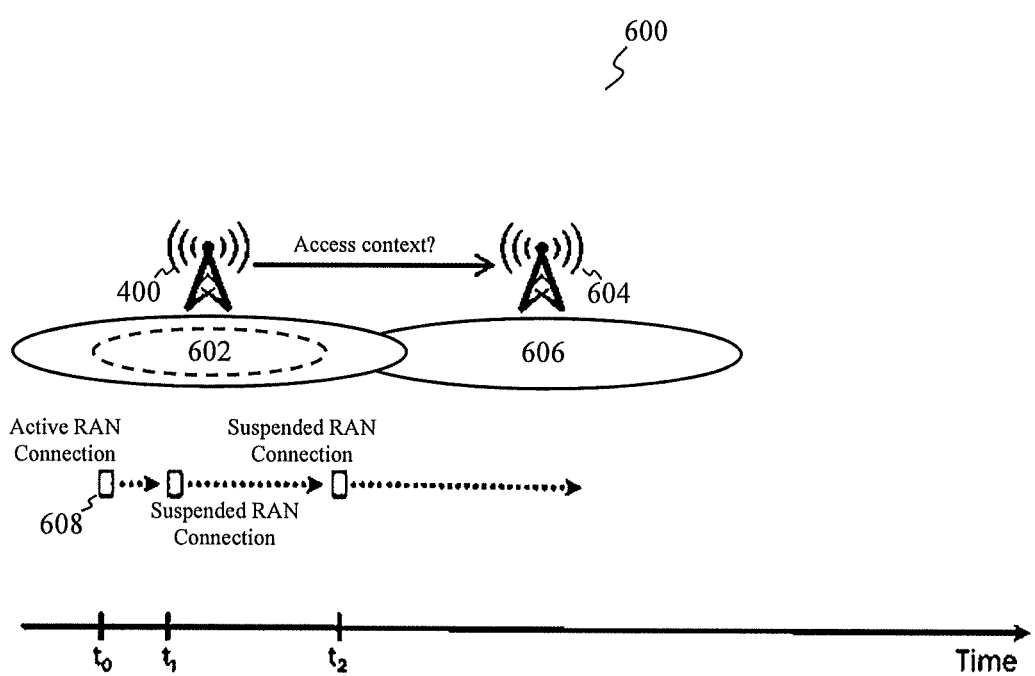
FIG. 6 shows one example of how to determine that a UE is about to exit an anchor cell.

FIG. 6 shows one example of how to perform the step S506, i.e. how to determine that the UE is about to exit the anchor cell. As shown in FIG. 6, a RAN 600 consists of two network nodes: the anchor network node 400 serving an anchor cell 602 and a network node 604 serving a cell 606. A dashed area inside the anchor cell 602 is defined by a RSRP threshold. A UE 608 is initially (at a time $t_0$) located in the anchor cell 602 in the active RAN connection state. Let us now assume that, at a time $t_1$, the anchor network node 400 causes the UE 608 to transit to the suspended RAN connection state, and decides that the UE 608 is not going to leave the anchor cell 602 due to its mobility state "slow-moving" and the high RSRP of the anchor network node 400 (i.e. since the UE 608 is within the dashed area, the RSPR of the anchor network node 400 is more than the RSPR threshold). Further, at a time $t_2$, the anchor network node 400 determines that the UE 608 is about to leave the anchor cell 602, because the UE 608 is outside the dashed area, i.e. the RSRP of the anchor network node 400 is less than the RSRP threshold, and its mobility state has changed to "fast-moving". In this case, the anchor network node 400 may proceed to the step S508 of the method 500 to determine the target time when the next data transfer is likely initiated by the UE 608, and at least one target cell in which the UE 608 would appear to be located at the target time. To do this, the anchor network node 400 should consider the mobility information together with the traffic profile, as will be explained below.

Figure 7:
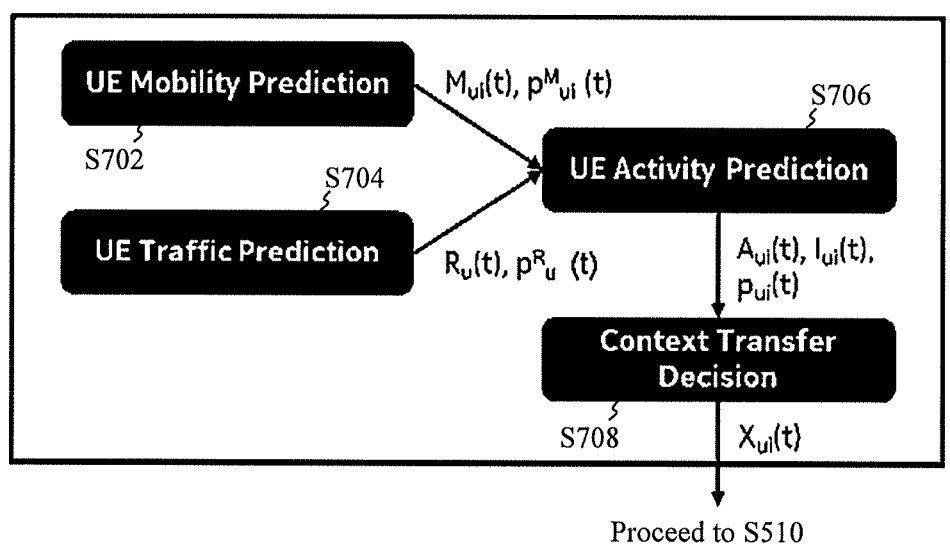
FIG. 7 shows a flowchart for predicting when and to where the access context should be transferred.

FIG. 7 shows a flowchart 700 for implementing the step S508 of the method 500 in accordance with one example embodiment. The flowchart 700 comprises substeps S702-S708, all of which may be performed by the processor 402 of the anchor network node 400. In the meantime, the substeps S702 and S704 may be executed by the processor 402 in parallel or in sequence. The substep S702 is aimed at predicting a UE mobility $M_{ui}(t)$ of each UE u at a time t, i.e. when a UE u is within a cell 1, and a probability distribution $p^M_{ui}(t)$ of the UE mobility prediction. The substep S704 is aimed at predicting traffic profile $R_u(t)$ of each UE u at the time t, i.e. the amount of traffic the UE u has to send at time t, and a probability distribution $p^R_u(t)$ of the traffic profile prediction. The substep 706 is aimed at computing discrete functions indicating a UE activity, namely its occurrence $I_{ui}(t)$ and duration $A_{ui}(t)$, for each UE u and a probability distribution $p_{ui}(t)$ of each UE activity based on the predictions made in the steps S702 and S704. The last substep 708 is aimed at making a decision $X_{ui}(t)$ on whether the access context of the UE u is to be transferred to the target network node i at the time t. Each of the above functions will be now described in more detail.

Figure 8:
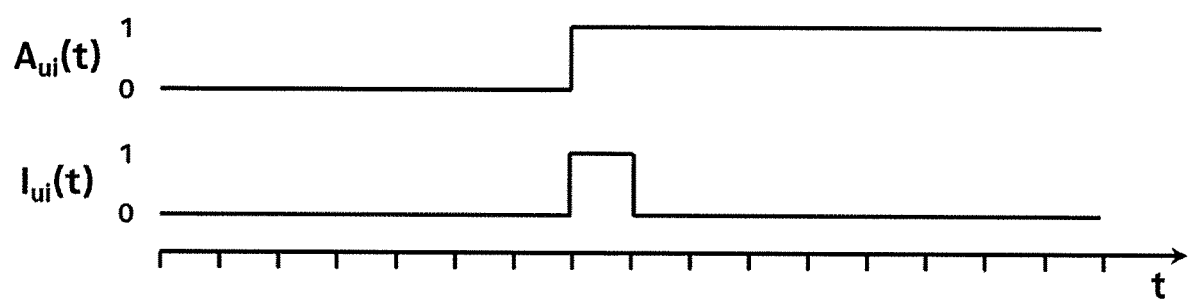
FIG. 8 illustrates discrete functions $I_{ui}(t)$ and duration $A_{ui}(t)$ that model a UE activity.

FIG. 8 illustrates the discrete functions $I_{ui}(t)$ and duration $A_{ui}(t)$ that model the UE activity of the UE u. As noted above, the function $A_{ui}(t)$ indicates the activity duration of the UE u in the target network node i, while the function $I_{ui}(t)$ takes value 1 only when the UE u becomes active (e.g. having data to delivery to the RAN). As shown in FIG. 8, the function $A_{ui}(t)$ is equal to 1 only when the function $M_{ui}(t)$ indicates that the UE u is in the target network node i and the function $R_u(t)$ indicates the amount of traffic UE u has to transmit at the time t. To this end, the function $M_{ui}(t)$ may be defined as follows:

$$M_{ui}(t) = \begin{cases} 1 & \text{if } UE\ u \text{ is in the network node } i \text{ at time } t \\ 0 & \text{otherwise} \end{cases}$$

As for the function $R_u(t)$, it can provide a data rate of the UE u at the time t: $R_u(t) \in \mathbb{R}_+$, where $\mathbb{R}_+$ is the set of positive real numbers. By merging these two functions, the function $A_{ui}(t)$ can be computed.

This deterministic model for the UE activity prediction can be extended to capture uncertainties of the mobility information and the traffic profile, for example, by estimating the probability distributions $p^M_{ui}(t)$ and $p^R_u(t)$. Given the aforesaid for the functions $M_{ui}(t)$ and $R_{ui}(t)$, the probability that the UE u is in the target network node i at the time t: $P(M_{ui}(t)=1)=p_{ui}^M(t) \in [0,1]$, and the probability that the UE u has traffic to transmit at time t: $P(R_u(t)>0)=p_u^R(t) \in [0,1]$. From these probability distributions, one can compute $P(I_{ui}(t)=1)=p_{ui}(t) \in [0,1]$, which means the probability that UE u becomes active in the target network node i at the time t (i.e. it needs to initiate the data transfer either from the active or suspended RAN connection state).

Table 1 provides the main parameters which may be used to find the function $X_{ui}(t)$ in the substep S708.

TABLE 1

Main parameters input to the PFD module

| Parameter | Description |
|---|---|
| U | Set of UEs in the suspended RAN connection state |
| N | Set of network nodes in the same RAN |
| $\mathcal{T}$ | Set of timeslots |
| T | Duration of a timeslot |
| H | Number of timeslots in the set T |
| E | Set of logical links connecting the network nodes though the Xn interface |
| $L_u$ | Size of the access context of the UE u∈U (in bits) |
| $b_e$ | Bandwidth of the logical link e∈E (in b/s) |
| $m_i$ | Memory capacity of the network node i for storing the access context (in bits) |
| k(u)∈N | Anchor network node of the UE u. Function k: U → N maps UEs to their corresponding network nodes |
| s(e)∈N | Source network node of the logical link e of the Xn interface |
| t(e)∈N | Target network node of the logical link e of the Xn interface |
| $D_{k(u)i}$ | Latency to transfer the access context of the UE u from the anchor network node to the target network node i. It is defined by the delay of the retrieval procedure triggered by the target network node to receive the access context from the anchor network node. |

In one example embodiment, the function $X_{ui}(t)$ is computed by solving an optimization problem. Such an optimization problem should be construed in accordance with its definition in mathematics. In other words, the optimization problem used herein may generally consist in maximizing or minimizing a real function by systematically choosing input values from within an allowed set and computing the value of the function. One non-limitative example of the optimization problem, which may be used to compute the function $X_{ui}(t)$, is the following Mixed Integer Linear Programming (MILP) problem:

$$\min \sum_{\tau \in \mathcal{T}} \sum_{t \in \mathcal{T}: t < \tau} \sum_{u \in \mathcal{U}} \sum_{i \in N} (1 - X_{ui}(t)) D_{k(u)i} I_{ui}(\tau) \quad (1)$$

s.t.:

$$\sum_{t \in \mathcal{T}, i \in N} X_{ui}(t) \leq 1 \quad \forall u \in \mathcal{U}, i \in N \quad (2)$$

$$\sum_{u \in N: k(u) = s(e)} X_{ut(e)}(t) \frac{L_u}{T} \leq b_e \quad \forall t \in \mathcal{T}, e \in \mathcal{E} \quad (3)$$

$$\sum_{t \in \mathcal{T}, u \in \mathcal{U}} X_{ui}(t) L_u \leq m_i \quad \forall i \in N \quad (4)$$

$$X_{ui}(t) \in \{0, 1\} \quad \forall u \in \mathcal{U}, i \in N, t \in \mathcal{T} \quad (5)$$

In particular, the objective function (1) represents the overall delay experienced by the UE in the suspended RAN connection state due to the access context transfer from the anchor network node 400 when initiating the data transfer from the active or suspended RAN connection state. The goal of the whole flowchart 700 (or the step S508 of the method 500) is to schedule the transfer decisions of the access context before the UEs in the suspended RAN connection state start initiating the data transfer from the active or suspended RAN connection state. The set of constraints (2) forces the transfer of the access context of the UE u to a specific target network node at most one time. The set of constrains (3) model the capacity constraints of the logical link connecting the target network nodes through the Xn interface, while the set of constraints (4) limits the number of the access context that may be stored in a memory of each target network node for this purpose.

In one other example embodiment, the function $X_{ui}(t)$ is obtained by implementing a priority scheduling algorithm (for example, greedy algorithm) which, at any decision time, uses a policy similar to the Earliest Deadline First (EDF) policy to select the UEs in the suspended RAN connection state whose access context is sent to the next target network node where the active RAN connection state will likely be resumed. The algorithm takes as inputs the same parameters as those illustrated in FIG. 8 and provides as an output the scheduling decisions for transferring the access context from the anchor network node 400 to the target network nodes. The algorithm itself may be implemented as the following pseudo code:

```
Algorithm Calculate ∀u ∈ 𝒰, i ∈ 𝒩, t ∈ 𝒯, X_ui(t)
Require: ∀_u ∈ 𝒰, i ∈ 𝒩, τ_u^i ∈ 𝒯
Require: t ∈ 𝒯, e ∈ ε, b_e(t) ← b_e
    t ← 0
    repeat
        Q ← {(u, i): u ∈ 𝒰 ∧ i ∈ 𝒩 ∧ τ_u^i > t ∧ ∄t ∈ 𝒯, X_ui(t) = 1}
        Sort Q in non-decreasing order of τ_u^i
        repeat
            (u, i) ← pop(Q)
            e ← (k(u), i)

if b_e(t) − L_u/T ≥ 0 ∧ m_i − L_u ≥ 0 then b_e(t) ← b_e(t) − L_u/T m_i ← m_i − L_u
                X_ui(t) ← 1
            end if
        until Q ≠ ∅
        t ← t + 1
    until t ≠ 𝒯
```

More specifically, at each time instant, the above algorithm selects the UEs that will become active in the future in any target network node and transfer their access context. If there is not enough bandwidth on the logical link connecting the anchor and target network nodes, the algorithm selects only the UEs with the earliest activation time. The earliest activation time of UE u∈U in the target network node i∈N is defined as follows:

$$\tau_u^i = \min\{\tau \in T: I_{ui}(\tau) > 0\}.$$

The earliest activation time simply denotes the time instant during a decision horizon when the UE u initiates the data transfer, for example, by switching from the suspended RAN connection state to the active RAN connection state in a particular target network node i. The algorithm stores in a queue Q all UEs in the suspended RAN connection state and future serving network nodes for which the earliest activation time is not over yet ($\tau_u^i > t$) and no access context transfer has been decided yet ($\exists \in T: X_{ui}(t) = -1$). The queue is sorted in non-decreasing order of the earliest activation time in order to give priority to the UEs with the earliest activation time.

After deciding for the access context transfer for a specific pair (u, i) (i.e. the UE u and the target network node i), the above algorithm verifies the following capabilities before the actual transfer: If the residual bandwidth $b_{k(u),i}(t)$ of the logical link connecting the anchor network node k(u) and the next serving network node i as well as the residual memory $m_i$ of the next serving network node i are enough to transfer and store the access context of size $L_u$.

In one more other embodiment, the function $X_{ui}(t)$ is obtained by exploiting the probability distributions $p^M_{ui}(t)$ and $p^R_u(t)$ to cope with the uncertainties of the mobility information and the traffic profile reported, for example, by the UE or any other network node(s). In particular, a MILP problem similar to the one described above may be solved, where the objective function (1) is replaced with the expectation of the overall delay experienced by the UEs due to the missing access context. More specifically, a new objective function is given as follows:

$$\Sigma_{w \in T} \Sigma_{\tau \in T} \Sigma_{t \in T: t < \tau} \Sigma_{u \in U} \Sigma_{i \in N} (1 - X_{ui}(t)) D_{k(u),i} I_{ui}(\tau) p_{ui}(w).$$

The outermost summation of this new objective function represents the expectation according to the probability distributions estimated in the substep S706 of the flowchart 700.

The above greedy algorithm can be also extended to consider the probability distributions $p^M_{ui}(t)$ and $p^R_u(t)$ to decide when to schedule the access context transfer under uncertain knowledge of the mobility information and the traffic profile. To this end, at a decision time t, the queue Q is filled with any pair (u, i) (i.e. the UE u and the target network node i) for which the probability that UE u is active in the target network node i in the future is larger than zero $\exists \tau \in T: \tau > t: p_{ui}(\tau) > 0$). The queue Q is therefore defined as follows:

$$Q \leftarrow \{(u,i): u \in U \wedge i \in N \wedge (\exists \tau \in T: \tau > t: p_{ui}(\tau) > 0) \wedge \exists t \in T: X_{ui}(t) = 1\}$$

The rest of the pseudo code does not change.

In general, the flowchart 700 that is eventually aimed at deciding when (i.e. the time) and where (i.e. the target network node) to trigger/schedule the access context transfer, i.e. obtaining the function $X_{ui}(t)$, may be implemented at the following locations of the RAN:

(a) at a centralized node in the RAN; and
(b) at the anchor network node 400.

Figure 9:
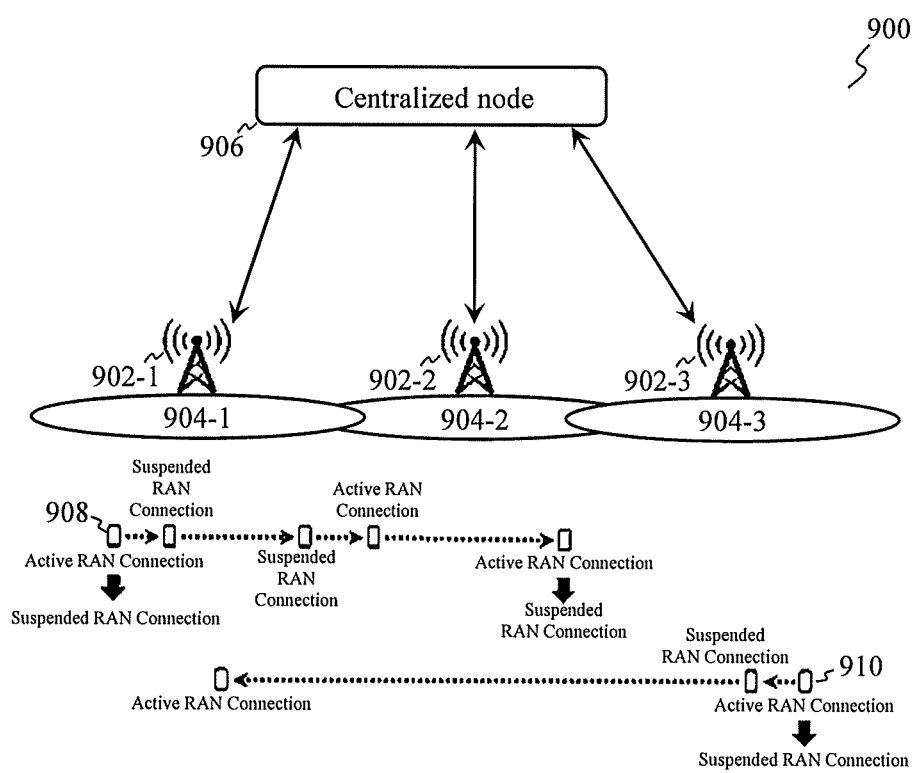
FIG. 9 schematically illustrates the case in which the flowchart shown in FIG. 7 is executed at a centralized node of a RAN.

FIG. 9 schematically illustrates case (a). More specifically, FIG. 9 shows a RAN 900 comprising the following three network nodes: a network node 902-1 serving a cell 904-1, a network node 902-2 serving a cell 904-2, and a network node 902-3 serving a cell 904-3. The RAN 900 further comprises a centralized node 906 which may be implemented, for example, as a remote server or administration center. Each of the network nodes 902-1, 902-2, and 902-3 may function as the anchor network node 400 or as a target network node at a certain time during the movements of UEs 908 and 910 within the RAN 900. However, in this case, the steps S506 and S508 of the method 500 and, correspondingly, the flowchart 700 are executed by the centralized node 906 rather than the processor 402.

As an example, let us now consider an initial time when the network node 902-1 functions as the anchor network node 400 for the UE 908 and the network node 902-3 functions as the anchor network node 400 for the UE 910.

In this case, the centralized node 906 receives, from the network nodes 902-1 (902-3), an indication that the UE 908 (910) has transitioned from the active RAN connection state to the suspended RAN connection state, as well as the UE-specific data 412 (i.e. the mobility information and the traffic profile) and the UE I-RNTI assigned by the network node 902-1 (902-3). After that, the centralized node 906 determines that the UE 908 (910) is about to exit the cell 904-1 (904-3) and predicts one of the following two time instants (by using the flowchart 700):

- (I) a time instant when a target network node (i.e. the network node 902-2 in case of the UE 908 and the network node 902-1 in case of the UE 910) should initiate an access context retrieval procedure for the UE 908 (910) with the anchor network node 902-1 (902-3) by using the existing Xn signaling (Retrieve UE context request/response). This time instant is communicated to the target network node; or
- (II) a time instant when the anchor network node 902-1 (902-3) should push the access context by using the existing Xn signaling. This time instant is communicated to the anchor network node 902-1 (902-3).

Depending on which of time instants (I) and (II) is predicted, one of the following outcomes is possible:

- in case of time instant (I), the target network node triggers the access context retrieval procedure with the anchor network node 902-1 (903-1) any time before time instant (I) communicated by the centralized node 906; or
- in case of time instant (II) (more preferred), the anchor network node 902-1 (902-3) pushes the access context any time before time instant (II) communicated by the centralized node 906.

The aforesaid may equally be applied to the case when the network node 902-2 itself functions as the anchor network node 400 for the UE 908.

Figure 10:
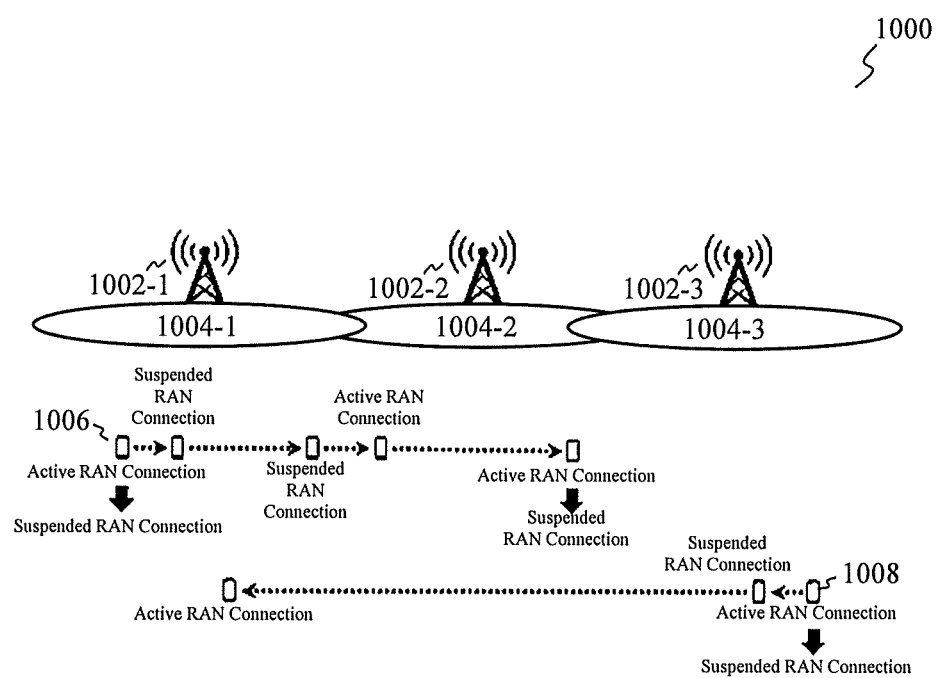
FIG. 10 schematically illustrates the case in which the flowchart shown in FIG. 7 is executed at any anchor network node of the RAN.

FIG. 10 schematically illustrates case (b). More specifically, FIG. 10 shows a RAN 1000 comprising the following three network nodes: a network node 1002-1 serving a cell 1004-1, a network node 1002-2 serving a cell 1004-2, and a network node 1002-3 serving a cell 1004-3. Each of the network nodes 1002-1, 1002-2, and 1002-3 may function as the anchor network node 400 or as a target network node at a certain time during the movements of the UEs 1006 and 1008 within the RAN 1000. In this case, the steps S506 and S508 of the method 500 and, correspondingly, the flowchart 700 are executed by the processor 402.

As an example, let us now consider an initial time when the network node 1002-1 functions as the anchor network node 400 for the UE 1006 and the network node 1002-3 functions as the anchor network node 400 for the UE 1008. In this case, the network node 1002-1 (1002-3) uses the UE-specific data 412 (i.e. the mobility information and the traffic profile) to determine that the UE 1006 (1008) is about to exit the cell 1004-1 (1004-3) and predicts when/to where the access context transfer should be initiated (by using the flowchart 700). After that, the network node 1002-1 (1002-3) may perform one of the following:

- It triggers a target network node (i.e. the network node 1002-2 in case of the UE 1006 and the network node 1002-1 in case of the UE 1008) to initiate the access context retrieval procedure. A proprietary (Xn-)message should, for instance, be implemented for this triggering. Upon such triggering, the target network node can use the existing Xn signaling for the access context retrieval.
- It pushes the access context using, e.g., a proprietary Xn signaling. Such access context pushing message (initiated by the anchor network node 1002-1 (1002-3)) could also be defined in the 3GPP standard for the Xn interface.

The aforesaid may equally be applied to the case when the network node 1002-2 itself functions as the anchor network node 400 for the UE 1006.

Referring again to FIG. 5, in some other example embodiments, the method 500 may be modified so as to be applicable in the cases when the UE-specific data 412 is constituted by only one of the mobility information and the traffic profile. Each of such example embodiments is briefly described below.

More specifically, if there is only the traffic profile pre-stored as the UE-specific data 412, the step S506 may be omitted, and the step S508 may consist only in predicting, based on the pre-stored traffic profile, the target time when the UE is about to initiate the next data transfer (which may request resuming the active RAN connection state). Given this, the step S510 may consist in sending the access context 410 to all cells in the RNA prior to the predicted time. As noted above, the RNA update message may be part of the traffic profile too. It should also be noted that this example embodiment is feasible only if the UE is still in the suspended RAN connection state with the same anchor node at the predicted time, and the access context 410 is transferred to any network node in the RNA as composed at the predicted time (the RNA might have been updated, in principle, before the target time). By so doing, one may alleviate or even eliminate the above-discussed delay and signalling issues peculiar to the prior art solutions.

At the same time, if there is only the mobility information pre-stored as the UE-specific data 412, the step S506 remains in force, but the step S508 may consist in predicting, based on the pre-stored mobility information, the target cell(s) where the UE will likely appear in the nearest future. For example, the target cells may be taken from the list of the best neighbor cells for the UE, and/or predicted based on the RRM measurements of the anchor cell and the neighbor cells. Given this, the step S510 may consist in sending the access context 410 to all network nodes serving the target cell(s) thus predicted, for example, immediately after the UE moves to the suspended RAN connection state in the anchor cell, if the signaling/storage capacity of the RAN allows doing that, or at the time when the next update to the mobility information occurs, if the signaling/storage capacity of the RAN is limited. By so doing, one may alleviate or even eliminate the above-discussed storage and signalling issues peculiar to the prior art solutions.

Downlink Scenario

In the downlink scenario, the following prediction should be made:

- where the UE could be located at the time when the RAN receives downlink data for the UE (i.e. in which network node(s)/cell(s) within the RAN).

The above prediction above may then be used as follows: The anchor network node of the UE can page the UE in the suspended RAN connection state selectively via one or more predicted cells, thus minimizing the network signaling overhead. Thus, the paging over the Xn interface will occur only via one or more relevant network nodes in the RAN (i.e. some network nodes in the RNA but not all).

Figure 11:
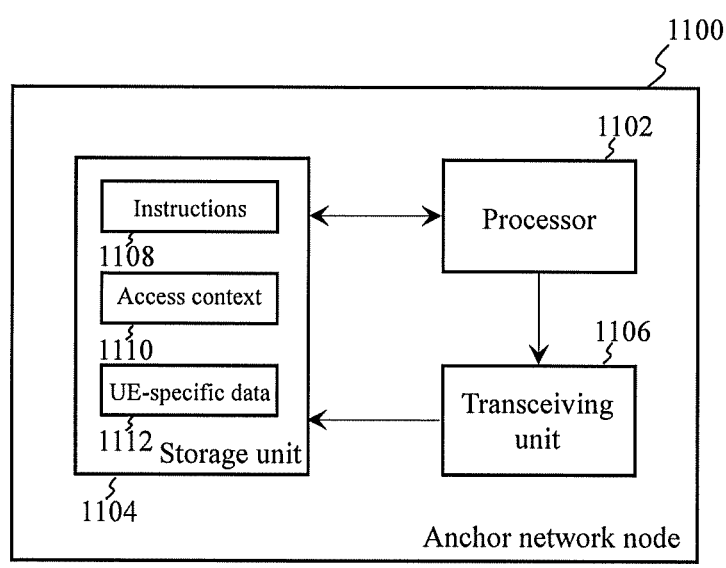
FIG. 11 shows a block-scheme of an anchor network node capable of implementing the downlink scenario (i.e. the network-initiated resume of the active RAN connection state) in accordance with one example embodiment.

FIG. 11 shows a block-scheme of an anchor network node 1100 capable of implementing the downlink scenario in accordance with one example embodiment. As shown in FIG. 11, the anchor network node 1100 comprises at least the following constructive elements: a processor 1102, a storage unit 1104, and a transceiving unit 1106. The storage unit 1104 is coupled to the processor 1102 and stores processor-executable instructions 1108 which, when executed by the processor 1102, cause the processor 1102 to perform the aspects of the present disclosure, as will be explained later. The storage unit 1104 further comprises: an access context 1110 required to initiate data transfer when the UE (such, for example, as any one of the UE 306, 608, 908, 910, 1006, 1008 shown in FIGS. 3, 6, 9, and 10) is in the active or suspended RAN connection state; and UE-specific data 1112 relating to the UE. In particular, the UE-specific data 1112 may comprise mobility information and a traffic profile. At the same time, contrary to the uplink scenario, the traffic profile may not be considered in the downlink scenario. It should be noted that the number, arrangement and interconnection of the constructive elements constituting the anchor network node 1100, which are shown in FIG. 11, are not intended to be any limitation of the present disclosure, but merely used to provide a general idea of how the constructive elements may be implemented within the anchor network node 1100. In one other exemplary embodiment, the transceiving unit 1106 may be implemented as two individual devices, with one for receiving operations and another for transmitting operation. Irrespective of its implementation, the transceiving unit 1106 is implied to be capable of performing different operations required to perform the reception and transmission of different signals, such, for example, as signal modulation/demodulation.

It should also be noted that each of the processor 1102, the storage unit 1104, the transceiving unit 1106 and the processor-executable instructions 1108 may be implemented in the same or similar manner as corresponding one of the processor 402, the storage unit 404, the transceiving unit 406 and the processor-executable instructions 408 of the anchor network node 400 shown in FIG. 4. The same may also be said about the mobility information and the traffic profile: They may be configured as described above in the uplink scenario.

Figure 12:
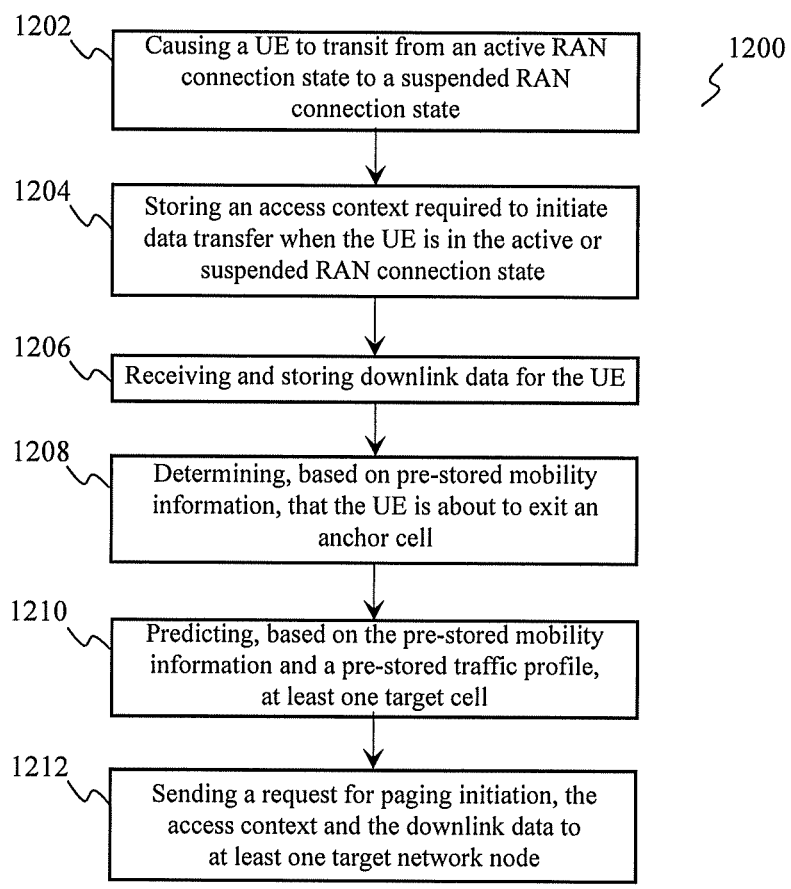
FIG. 12 shows a flowchart of a method for operating the anchor network node shown in FIG. 11 in accordance with one exemplary embodiment.

FIG. 12 shows a flowchart of a method 1200 for operating the anchor network node 1100 in accordance with one exemplary embodiment. Each of the steps of the method 1200 is performed by corresponding one of the above-described constructive elements constituting the anchor network node 1100. The method 1200 starts with a step S1202, in which the processor 1102 cause the UE to transit from the active RAN connection state to the suspended RAN connection state. In an alternative example embodiment, the UE may perform such transition by itself. After that or in parallel, the storage unit 1104 may store, in a step S1204, the access context 1110 required to initiate, in future, the data transfer when the UE is in the active or suspended RAN connection state. Further, the method 500 proceeds to a step S1206, in which the transceiving unit 1106 receives downlink data for the UE and the storage unit 1104 stores them for further use. Next, in a step S1208, the processor 1102 determines, based on the pre-stored mobility information, that the UE is about to exit an anchor cell. In this case, the anchor cell is implied as a cell served by the anchor network node 1100. The method 1200 then proceeds to a step S1210, in which the processor 1102 predicts, based on the pre-stored mobility information and the pre-stored traffic profile, at least one target cell in which the UE would appear to be located subsequently, i.e. upon exiting the anchor cell. The method 1200 ends up with a step S1212, in which the processor 1102 instructs the transceiving unit 1106 to send a request for paging initiation, the access context 1110 and the downlink data to at least one target network node serving the at least one target cell, so that the at least one target network node could page the UE to deliver the downlink data to the UE. It should be noted that the request for paging initiation is a request for causing the target network node(s) to initiate a paging procedure, i.e. send paging messages within its or their target cell(s), with each paging message being used to "wake up" the UE and indicate that there is some downlink data for it. It is noted that before the paging indication, the network may send a "wake-up signal" and/or "wake-up indication" for UE power saving purposes to indicate an upcoming paging message.

Different example embodiments of the method 1200 are similar to those discussed above in respect to the method 500, except that the traffic profile is not used therein. For example, the steps S1210 of the method 1200 may also be executed by using the flowchart 700. Moreover, the steps S1208 and S1210 may similarly be executed by different locations, as described above with reference to FIGS. 9 and 10.

It should be noted that each block or operation of the methods 500, 1200 and the flowchart 700, or any combinations of the blocks or operations, can be implemented by various means, such as hardware, firmware, and/or software. As an example, one or more of the blocks or operations described above can be embodied by processor executable instructions, data structures, program modules, and other suitable data representations. Furthermore, the processor executable instructions which embody the blocks or operations described above can be stored on a corresponding data carrier and executed by at least one processor implementing functions of the anchor network node 400 or 1100, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

The present disclosure will now be described with reference to Examples. These Examples are intended to illustrate the present disclosure more specifically, but the scope of the present disclosure is not limited by these Examples.

EXAMPLES

1. An anchor network node comprising:
    a transceiving unit;
    a storage unit configured to store:
        an access context required to initiate data transfer when a user equipment (UE) is in an active or suspended Radio Access Network (RAN) connection state;
        mobility information and a traffic profile both relating to the UE; and
        processor-executable instructions;
    at least one processor coupled to the storage unit and configured, when executing the processor-executable instructions, to:

(i) determine, based on the mobility information, that the UE is about to exit an anchor cell served by the anchor network node;
(ii) predict, based on the mobility information and the traffic profile, a target time when the UE is about to initiate the data transfer, and at least one target cell in which the UE would appear to be located at the target time; and
(iii) instruct the transceiving unit to send the access context to at least one target network node serving the at least one target cell before the target time.

2. The anchor network node according to Example 1, wherein the transceiving unit is configured to:
acquire the mobility information and the traffic profile at least one time before or after initiating each data transfer when the UE is in the active or suspended RAN connection state; and
provide the mobility information and the traffic profile to the storage unit for their storage.

3. The anchor network node according to Example 2, wherein the mobility information comprises Radio Resource Management (RRM) measurements, a UE mobility state, a list of the best neighbor cells for the UE and network nodes belonging to the best neighbor cells, or any combination thereof, and wherein the traffic profile comprises a traffic distribution over time, and/or an estimate of the traffic distribution over time to be expected after the suspension of the active RAN connection state.

4. The anchor network node according to Example 3, wherein the RRM measurements comprise a Reference Signal Received Power (RSRP) of the anchor cell, and the at least one processor is configured to determine that the UE is about to exit the anchor cell if the UE mobility state is set to be non-stationary and the RSRP of the anchor cell is less than a threshold at the time when the active RAN connection state has been suspended.

5. The anchor network node according to Example 3, wherein the RRM measurements comprise a RSRP that is the highest among RSRPs of the best neighbor cells, and the at least one processor is configured to determine that the UE is about to exit the anchor cell if the UE mobility state is set to be non-stationary and the highest RSRP is more than a threshold at the time when the active RAN connection state has been suspended.

6. The anchor network node according to Example 3, wherein the at least one processor is configured to determine that the UE is about to exit the anchor cell if the UE mobility state has changed from stationary to non-stationary.

7. The anchor network node according to Example 1, wherein the at least one processor is configured to predict the target time and the at least one target cell by solving an optimization problem or using a priority scheduling algorithm.

8. The anchor network node according to Example 7, wherein the at least one processor is further configured to use probability distributions of the mobility information and the traffic profile when solving the optimization problem or using the priority scheduling algorithm.

9. The anchor network node according to Example 8, wherein the at least one processor is configured to predict the target time and the at least one target cell by using supervised or unsupervised machine learning algorithms.

10. An anchor network node comprising:
a transceiving unit configured to receive downlink data for a User Equipment (UE) being in a suspended Radio Access Network (RAN) connection state;
a storage unit configured to store:
an access context required to initiate data transfer when the UE is in an active RAN connection state or the suspended RAN connection state;
mobility information and a traffic profile both relating to the UE;
the downlink data; and
processor-executable instructions;
at least one processor coupled to the storage unit and configured, when executing the processor-executable instructions, to:
(i) determine, based on the mobility information, that the UE is about to exit an anchor cell served by the anchor network node;
(ii) predict, based on the mobility information and the traffic profile, at least one target cell in which the UE would appear to be located upon exiting the anchor cell; and
(iii) instruct the transceiving unit to send a request for paging initiation, the access context and the downlink data to at least one target network node serving the at least one target cell, so that the at least one target network node could page the UE to deliver the downlink data to the UE.

11. The anchor network node according to Example 10, wherein the transceiving unit is configured to:
acquire the mobility information and the traffic profile at least one time before or after initiating each data transfer when the UE is in the suspended or active RAN connection state; and
provide the mobility information and the traffic profile to the storage unit for the storage thereof.

12. The anchor network node according to Example 11, wherein the mobility information comprises Radio Resource Management (RRM) measurements, a UE mobility state, a list of the best neighbor cells for the UE and network nodes belonging to the best neighbor cells, or any combination thereof, and wherein the traffic profile comprises a traffic distribution over time, and/or an estimate of the traffic distribution over time to be expected after the suspension of the active RAN connection state.

13. The anchor network node according to Example 12, wherein the RRM measurements comprise a Reference Signal Received Power (RSRP) of the anchor cell, and the at least one processor is configured to determine that the UE is about to exit the anchor cell if the UE mobility state is set to be non-stationary and the RSRP of the anchor cell is less than a threshold at the time when the active RAN connection state has been suspended.

14. The anchor network node according to Example 12, wherein the RRM measurements comprise a RSRP that is the highest among RSRPs of the best neighbor cells, and the at least one processor is configured to determine that the UE is about to exit the anchor cell if the UE mobility state is set to be non-stationary and the highest RSRP is more than a threshold at the time when the active RAN connection state has been suspended.

15. The anchor network node according to Example 12, wherein the at least one processor is configured to determine that the UE is about to exit the anchor cell if the UE mobility state has changed from stationary to non-stationary.

16. The anchor network node according to Example 10, wherein the at least one processor is configured to predict the at least one target cell by solving an optimization problem or using a priority scheduling algorithm.

17. The anchor network node according to Example 16, wherein the at least one processor is further configured to use probability distributions of the mobility information and the traffic profile when solving the optimization problem or using the priority scheduling algorithm.
18. The anchor network node according to Example 17, wherein the at least one processor is configured to predict the at least one target cell by using supervised or unsupervised machine learning algorithms.
19. A method for operating an anchor network node, comprising:
    storing an access context required to initiate data transfer when a user equipment (UE) is in an active or suspended Radio Access Network (RAN) connection state;
    determining, based on pre-stored mobility information, that the UE is about to exit an anchor cell served by the anchor network node;
    predicting, based on the pre-stored mobility information and a pre-stored traffic profile, a target time when the UE is about to initiate the data transfer, and at least one target cell in which the UE would appear to be located at the target time; and
    sending the access context to at least one target network node serving the at least one target cell before the target time.
20. The method according to Example 19, further comprising:
    pre-acquiring and storing the mobility information and the traffic profile at least one time before or after initiating each data transfer when the UE is in the active or suspended RAN connection state.
21. The method according to Example 20, wherein the mobility information comprises Radio Resource Management (RRM) measurements, a UE mobility state, a list of the best neighbor cells for the UE and network nodes belonging to the best neighbor cells, or any combination thereof, and wherein the traffic profile comprises a traffic distribution over time, and/or an estimate of the traffic distribution over time to be expected after the suspension of the active RAN connection state.
22. The method according to Example 21, wherein the RRM measurements comprise a Reference Signal Received Power (RSRP) of the anchor cell, and wherein said determining comprises determining that the UE is about to exit the anchor cell if the UE mobility state is set to be non-stationary and the RSRP of the anchor cell is less than a threshold at the time when the active RAN connection state has been suspended.
23. The method according to Example 21, wherein the RRM measurements comprise a RSRP that is the highest among RSRPs of the best neighbor cells, and wherein said determining comprises determining that the UE is about to exit the anchor cell if the UE mobility state is set to be non-stationary and the highest RSRP is more than a threshold at the time when the active RAN connection state has been suspended.
24. The method according to Example 21, wherein said determining comprises determining that the UE is about to exit the anchor cell if the UE mobility state has changed from stationary to non-stationary.
25. The method according to Example 19, wherein said predicting the target time and the at least one target cell is performed by solving an optimization problem or using a priority scheduling algorithm.
26. The method according to Example 25, further comprising using probability distributions of the mobility information and the traffic profile when solving the optimization problem or using the priority scheduling algorithm.
27. The method according to Example 26, said predicting the target time and the at least one target cell is performed by using supervised or unsupervised machine learning algorithms.
28. A method for operating an anchor network node, comprising:
    storing an access context required to initiate data transfer when a user equipment (UE) is in an active or suspended Radio Access Network (RAN) connection state;
    receiving and storing downlink data for the UE;
    determining, based on pre-stored mobility information, that the UE is about to exit an anchor cell served by the anchor network node;
    predicting, based on the pre-stored mobility information and a pre-stored traffic profile, at least one target cell in which the UE would appear to be located upon exiting the anchor cell; and
    sending a request for paging initiation, the access context and the downlink data to at least one target network node serving the at least one target cell, so that the at least one target network node could page the UE to deliver the downlink data to the UE.
29. The method according to Example 28, further comprising:
    pre-acquiring and storing the mobility information and the traffic profile at least one time before or after initiating each data transfer when the UE is in the suspended or active RAN connection state.
30. The method according to Example 29, wherein the mobility information comprises Radio Resource Management (RRM) measurements, a UE mobility state, a list of the best neighbor cells for the UE and network nodes belonging to the best neighbor cells, or any combination thereof, and wherein the traffic profile comprises a traffic distribution over time, and/or an estimate of the traffic distribution over time to be expected after the suspension of the active RAN connection state.
31. The method according to Example 30, wherein the RRM measurements comprise a Reference Signal Received Power (RSRP) of the anchor cell, and wherein said determining comprises determining that the UE is about to exit the anchor cell if the UE mobility state is set to be non-stationary and the RSRP of the anchor cell is less than a threshold at the time when the active RAN connection state has been suspended.
32. The method according to Example 30, wherein the RRM measurements comprise a RSRP that is the highest among RSRPs of the best neighbor cells, and wherein said determining comprises determining that the UE is about to exit the anchor cell if the UE mobility state is set to be non-stationary and the highest RSRP is more than a threshold at the time when the active RAN connection state has been suspended.
33. The method according to Example 30, wherein said determining comprises determining that the UE is about to exit the anchor cell if the UE mobility state has changed from stationary to non-stationary.
34. The method according to Example 28, wherein said predicting the at least one target cell is performed by solving an optimization problem or using a priority scheduling algorithm.
35. The method according to Example 34, further comprising using probability distributions of the mobility information and the traffic profile when solving the optimization problem or using the priority scheduling algorithm.

36. The method according to Example 35, wherein said predicting the at least one target cell is performed by using supervised or unsupervised machine learning algorithms.

37. A computer program product comprising a computer-readable medium that stores a computer code, wherein the computer code is configured, when executed by at least one processor, to cause the at least one processor to perform the method according to any one of Examples 19 to 27.

38. A computer program product comprising a computer-readable medium that stores a computer code, wherein the computer code is configured, when executed by at least one processor, to cause the at least one processor to perform in the method according to any one of Examples 28 to 36.

Although the example embodiments and, in particular, Examples 1-38 of the present disclosure are described herein, it should be noted that any various changes and modifications could be made therein, without departing from the scope of legal protection which is defined by the appended claims. In the appended claims, the word "comprising" and its derivatives does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. An anchor network node comprising:
   at least one processor; and
   at least one non-transitory memory storing instructions, that when executed by the at least one processor, cause the anchor network node at least to:
      receive an access context required to initiate data transfer when a user equipment is in an active or suspended radio access network connection state;
      receive mobility information and a traffic profile both relating to the user equipment;
      wherein the mobility information and the traffic profile are received one time before or after initiating each data transfer when the user equipment is in the suspended or active radio access network connection state; and
      provide the mobility information and the traffic profile to a storage unit for storage thereof; and
   to:
      (i) determine, based on the mobility information, that the user equipment is to exit an anchor cell served by the anchor network node;
      (ii) predict, based on the mobility information and the traffic profile, a target time when the user equipment is to initiate the data transfer, and at least one target cell in which the user equipment would appear to be located at the target time; and
      (iii) send the access context to at least one target network node serving the at least one target cell before the target time.

2. The anchor network node according to claim 1, wherein the mobility information comprises radio resource management measurements, a user equipment mobility state, a list of best neighbor cells for the user equipment and network nodes belonging to the best neighbor cells, or any combination thereof, and wherein the traffic profile comprises at least one of a traffic distribution over time, or an estimate of the traffic distribution over time to be expected after a suspension of the active radio access network connection state.

3. The anchor network node according to claim 2, wherein the at least one non-transitory memory storing instructions executed by the at least one processor is configured to perform operation (i) based on one of:
   when the radio resource management measurements comprise a reference signal received power of the anchor cell, the user equipment mobility state is set to be non-stationary, and the reference signal received power of the anchor cell is less than a threshold at the time when the active radio access network connection state has been suspended; or
   when the radio resource management measurements comprise a reference signal received power that is a highest among reference signal received powers of the best neighbor cells, the user equipment mobility state is set to be non-stationary, and the highest reference signal received power is more than a threshold at a time when the active radio access network connection state has been suspended; or
   the user equipment mobility state has changed from stationary to non-stationary.

4. The anchor network node according to claim 1, wherein the at least one non-transitory memory storing instructions executed by the at least one processor is configured to perform operation (ii) by solving an optimization problem or using a priority scheduling algorithm.

5. An anchor network node comprising:
   at least one processor; and
   at least one non-transitory memory storing instructions, that when executed by the at least one processor, cause the anchor network node at least to:
      receive downlink data for a user equipment being in a suspended radio access network connection state;
      provide acquired mobility information and a traffic profile to a storage unit to store:
         an access context required to initiate data transfer when the user equipment is in an active radio access network connection state or the suspended radio access network connection state;
         mobility information and the traffic profile both relating to the user equipment, wherein the mobility information and the traffic profile are acquired one time before or after initiating each data transfer when the user equipment is in the active or suspended radio access network connection state;
         the downlink data; and
         processor-executable instructions; and
   to:
      (i) determine, based on the mobility information, that the user equipment is to exit an anchor cell served by the anchor network node;
      (ii) predict, based on the mobility information and the traffic profile, at least one target cell in which the user equipment would appear to be located upon exiting the anchor cell; and
      (iii) send a request for paging initiation, the access context and the downlink data to at least one target network node serving the at least one target cell, so that the at least one target network node could page the user equipment to deliver the downlink data to the user equipment.

6. The anchor network node according to claim 5, wherein the mobility information comprises radio resource management measurements, a user equipment mobility state, a list of best neighbor cells for the user equipment and network nodes belonging to the best neighbor cells, or any combination thereof, and wherein the traffic profile comprises at least one of a traffic distribution over time, or an estimate of the traffic distribution over time to be expected after a suspension of the active radio access network connection state.

7. The anchor network node according to claim 6, wherein the at least one processor is configured to perform operation (i) based on one of:
   when the radio resource management measurements comprise a reference signal received power of the anchor cell, the user equipment mobility state is set to be non-stationary, and the reference signal received power of the anchor cell is less than a threshold at a time when the active radio access network connection state has been suspended; or
   when the radio resource management measurements comprise a reference signal received power that is a highest among reference signal received powers of the best neighbor cells, the user equipment mobility state is set to be non-stationary, and the highest reference signal received power is more than a threshold at the time when the active radio access network connection state has been suspended; or
   the user equipment mobility state has changed from stationary to non-stationary.

8. The anchor network node according to claim 5, wherein the at least one non-transitory memory storing instructions executed by the at least one processor is configured to perform operation (ii) by solving an optimization problem or using a priority scheduling algorithm.

9. A method for operating an anchor network node, comprising:
   storing an access context required to initiate data transfer when a user equipment is in an active or suspended radio access network connection state
   wherein the access content comprises mobility information and a traffic profile received one time before or after initiating each data transfer when the user equipment is in the active or suspended radio access network connection state; and
   providing the mobility information and the traffic profile to a storage unit for storage thereof;
   determining, based on pre-stored mobility information, that the user equipment is to exit an anchor cell served by the anchor network node;
   predicting, based on the pre-stored mobility information and a pre-stored traffic profile, a target time when the user equipment is to initiate the data transfer, and at least one target cell in which the user equipment would appear to be located at the target time; and
   sending the access context to at least one target network node serving the at least one target cell before the target time.

10. The method according to claim 9, wherein said predicting is performed by solving an optimization problem or using a priority scheduling algorithm.

11. A method, comprising:
    operating an anchor network node, comprising:
       storing an access context required to initiate data transfer when a user equipment is in an active or suspended radio access network connection state;
       wherein the access content comprises mobility information and a traffic profile received one time before or after initiating each data transfer when the user equipment is in the active or suspended radio access network connection state; and
       providing the mobility information and the traffic profile to a storage unit for storage thereof;
       receiving and storing downlink data for the user equipment;
       determining, based on pre-stored mobility information, that the user equipment is to exit an anchor cell served by the anchor network node;
       predicting, based on the pre-stored mobility information and a pre-stored traffic profile, at least one target cell in which the user equipment would appear to be located upon exiting the anchor cell; and
       sending a request for paging initiation, the access context and the downlink data to at least one target network node serving the at least one target cell, so that the at least one target network node could page the user equipment to deliver the downlink data to the user equipment.

12. The method according to claim 11, wherein said predicting is performed by solving an optimization problem or using a priority scheduling algorithm.

13. A computer program product comprising a non-transitory computer-readable medium that stores instructions, wherein the instructions are configured, when executed by at least one processor, to cause the at least one processor to perform the method according to claim 9.

* * * * *